US012752867B2

(12) United States Patent
Wiech et al.

(10) Patent No.: US 12,752,867 B2
(45) Date of Patent: Oct. 6, 2026

(54) SPOILER SYSTEM FOR A VEHICLE

(71) Applicant: Wuhan Lotus Cars Co., Ltd., Wuhan (CN)

(72) Inventors: Thomas Wiech, Darmstadt (DE); Falk Fritz, Raunheim (DE)

(73) Assignee: Wuhan Lotus Cars Co., Ltd., Wuhan (CN)

(*) Notice: Subject to any disclaimer, the term of this patent is extended or adjusted under 35 U.S.C. 154(b) by 350 days.

(21) Appl. No.: 18/262,180

(22) PCT Filed: Jan. 25, 2021

(86) PCT No.: PCT/EP2021/051635
§ 371 (c)(1),
(2) Date: Jul. 19, 2023

(87) PCT Pub. No.: WO2022/156915
PCT Pub. Date: Jul. 28, 2022

(65) Prior Publication Data
US 2024/0075994 A1 Mar. 7, 2024

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
USPC ....................................................... 296/180.1
See application file for complete search history.

(56) References Cited

U.S. PATENT DOCUMENTS

| | | | |
|---|---|---|---|
| 5,486,032 | A | 1/1996 | Reed et al. |
| 8,876,190 | B2 | 11/2014 | Durm et al. |
| 9,102,367 | B1 | 8/2015 | Beierl et al. |
| 10,173,619 | B2 | 1/2019 | Cha et al. |
| 10,894,568 | B2 | 1/2021 | Bauer et al. |
| 2005/0040668 | A1 | 2/2005 | Wood |

(Continued)

FOREIGN PATENT DOCUMENTS

| | | |
|---|---|---|
| CN | 103569223 A | 2/2014 |
| CN | 107585218 A | 1/2018 |
| CN | 108116515 | 6/2018 |

(Continued)

OTHER PUBLICATIONS

Durm et al., German Patent DE 102012106452 A1, English translation date Oct. 15, 2025. (Year: 2012).*

(Continued)

*Primary Examiner* — Caroline N Butcher
(74) *Attorney, Agent, or Firm* — JCIPRNET

(57) ABSTRACT

A spoiler system for a vehicle includes: an active rear spoiler; and a controller being configured to control the active rear spoiler; where the system further includes a channel and an additional active spoiler for arranging on a tail of a vehicle, where the additional active spoiler is arranged below the active rear spoiler, where the channel is arranged between the active rear spoiler and the additional active spoiler, and where the controller is further configured to control the additional active spoiler. The invention provides an improved spoiler system for a vehicle to improve the vehicle performance in matters of design language and driving performance.

9 Claims, 2 Drawing Sheets

(56) References Cited

U.S. PATENT DOCUMENTS

| | | | |
|---|---|---|---|
| 2018/0009402 | A1 | 1/2018 | Cha et al. |
| 2019/0351746 | A1 | 11/2019 | Del Gaizo et al. |

FOREIGN PATENT DOCUMENTS

| | | | | | |
|---|---|---|---|---|---|
| CN | 110615043 | A | | 12/2019 | |
| DE | 102011011102 | A1 | | 1/2012 | |
| DE | 102012106452 | A1 | * | 1/2014 | ............ B62D 37/02 |
| DE | 102018114519 | | | 12/2019 | |
| DE | 102018114519 | A1 | * | 12/2019 | ............ B62D 37/02 |
| EP | 2631161 | A1 | | 8/2013 | |
| FR | 3007378 | A1 | | 12/2006 | |
| KR | 101756031 | B1 | * | 7/2017 | ........... B62D 35/007 |

OTHER PUBLICATIONS

Cha Dong et al., Korean Pat. 101756031 B1, English translation date Oct. 16, 2025. (Year: 2016).*

Bauer et al., German Patent No. DE 102018 114519 A1, English translation dated 2026. (Year: 2019).*

International Search Report and Written Opinion of the International Searching Authority for International Application No. PCT/EP2021/051635, mailed on Oct. 7, 2021, in 11 pages.

"The First Office Action of China Counterpart Application", with English translation thereof, issued on Nov. 19, 2025, pp. 1-16.

"Notice of Second Review Opinion of China Counterpart Application", with English translation thereof, issued on Feb. 5, 2026, pp. 1-24.

"notice for the third trial of China Counterpart Application", issued on Jun. 23, 2026, with English translation thereof, p. 1-p. 20.

* cited by examiner

SPOILER SYSTEM FOR A VEHICLE

CROSS-REFERENCE TO RELATED APPLICATIONS

This application is the U.S. National Phase under 35 U.S.C. § 371 of International Application No. PCT/EP2021/051635, filed Jan. 25, 2021, titled SPOILER SYSTEM FOR A VEHICLE, the entirety of each of which is hereby expressly incorporated by reference herein.

BACKGROUND

Field

The invention relates to a spoiler system for a vehicle.

Description of the Related Art

When a vehicle is driving, the aerodynamic properties of that vehicle create lifting forces and drag. Those lifting forces lift the vehicle from the ground reducing the stability of the vehicle such that the driver has less control of the vehicle. The drag reduces the aerodynamic properties of the vehicle and increases the required kinetic energy for moving the vehicle, i.e. reducing the maximum velocity of the vehicle or increasing the fuel consumption. Vehicles may comprise active spoilers to counter lifting forces and drag. Those active spoilers have a pivotable wing portion. The angle of a pivotable wing portion in relation to the vehicle may be adapted to the actual driving situation.

DE 10 2017 109 744 A1 describes a vehicle comprising an active rear spoiler, a top spoiler, a front spoiler and a ground spoiler. A controller controls all spoilers to adapt them to the current driving situation.

However, even such a spoiler system does not provide an optimal vehicle performance in design language and driving performance.

SUMMARY

The technical object of the invention may be providing an improved spoiler system for a vehicle and an improved method for controlling that spoiler system to improve the vehicle performance in matters of design language and driving performance.

According to a first aspect of the invention, a spoiler system for a vehicle is provided, the system comprising: an active rear spoiler; and a controller being configured to control the active rear spoiler; wherein the system further comprises a channel and an additional active spoiler for arranging on a tail of a vehicle, wherein the additional active spoiler is arranged below the active rear spoiler, wherein the channel is arranged between the active rear spoiler and the additional active spoiler, and wherein the controller is further configured to control the additional active spoiler.

The invention provides an active rear spoiler in combination with an additional active spoiler being arranged below the active rear spoiler. The active rear spoiler and the additional active spoiler form walls of a channel between them. Air streaming along the bottom side of the active rear spoiler flows through the channel. By using the additional active spoiler, the aerodynamic properties of the channel can be adapted to improve the function of the active rear spoiler. In the prior art, the shape of the tail of the vehicle below the active rear spoiler is constant and cannot be adapted. Thus, when adapting the active rear spoiler to a driving situation in the prior art, the angle of the active spoiler relative to the tail of the vehicle changes. Due to that changed angle, the space between the active rear spoiler and the tail of the vehicle may have a shape that induces turbulences in the airstream. Those turbulences may reduce the function of the rear spoiler and increase drag and lifting forces on the tail of the vehicle. The additional active spoiler according to the invention being arranged on the tail of the vehicle has the effect that the tail of the vehicle may be adapted to the actual driving situation by the controller. The space between the active rear spoiler and the tail of the vehicle may be adapted such, that turbulences are reduced or completely avoided. Then, the air streaming between the tail of the vehicle and the active rear spoiler causes reduced drag and reduced lifting forces. Thus, the invention provides a spoiler system for a vehicle that improves the vehicle performance in matter of design language and driving performance.

In an example, the controller may be configured to control the active rear spoiler and the additional active spoiler simultaneously.

In that example, the active rear spoiler and the additional active spoiler may be adapted to a current driving situation at the same time. This avoids periods, which may result in higher turbulences, wherein in those periods the active rear spoiler and the additional active spoiler are not adapted to each other.

Furthermore, the controller may for example be configured to control the active rear spoiler and the additional active spoiler such that the active rear spoiler and the additional active spoiler form parallel walls of the channel.

By forming parallel walls of the channel with the active rear spoiler and the additional active spoiler, air flowing through the channel is neither accelerated nor decelerated. This reduces or even avoids turbulences in the channel further reducing drag and lifting forces on the vehicle.

In a further example, the active rear spoiler may be a floating spoiler.

The additional active spoiler may for example further comprise a leading edge, which is attached to a tail of a vehicle, wherein the additional active spoiler is pivotable around the leading edge.

Thus, the additional active spoiler may be a flap being arranged at the tail of the vehicle. The leading edge of the flap is then attached to the tail of the vehicle. Furthermore, the leading edge provides a pivoting function for the flap such that the flap maybe splayed from the tail of the vehicle around the leading edge. The flap may be pivoted such that it is always parallel to the active rear spoiler.

According to a further aspect of the invention, a vehicle comprising a tail, a top surface facing upwards and a spoiler system according to the description above is provided, wherein the spoiler system is attached to the tail and the additional active spoiler comprises a channel-facing surface, which adds to the top surface.

The advantages and the effects of the vehicle are analogous to the advantages and the effects of the spoiler system according to the description above. Thus, it is referred to the above description for further detail.

Furthermore, according to that aspect of the invention, the additional active spoiler may increase the top surface of the vehicle with a channel-facing surface. This includes, that the additional active spoiler may cover or overlap with the top surface of the vehicle. The additional active supplier therefore adds an adaption function to the top surface of the vehicle in the region of the active rear spoiler.

In an example, the additional active spoiler may comprise an undeployed position and at least one deployed position, wherein the additional active spoiler is arranged flat on the tail in the undeployed position and is splayed from the tail in the deployed position.

Thus, the additional active spoiler may be put in the undeployed position such that the shape of the top surface of the vehicle is not adapted to the active rear spoiler. In an additional example, the additional active spoiler may lie flush on the tail in the undeployed position. This increases the flexibility of use of the spoiler system.

According to a further aspect of the invention, a method for controlling the spoiler system and/or vehicle according the description mentioned above is provided, the method comprising the following steps: determining a spoiler setting based on at least one driving property of the vehicle; adapting the active rear spoiler according to the determined spoiler setting; and pivoting the additional active spoiler according to the pivoting angle of the active rear spoiler.

The effects and advantages of the method for controlling the spoiler system and/or the vehicle are analogous to the effects and advantages of the spoiler system and/or other vehicle according to the above description. Therefore, it is referred to the above description for further detail. The controller for the spoiler system and/or vehicle may carry out the method. Sensors on the vehicle may determine the driving property, which may for example be the velocity of the vehicle. The sensors may be connected to the controller.

In an example, in the step: Pivoting the additional active spoiler according to the pivoting angle of the active rear spoiler, the additional active spoiler may be pivoted to a position being parallel to the active rear spoiler.

By arranging the active rear spoiler and the additional active spoiler parallel to each other, air flowing between the active rear spoiler and the additional active spoiler is neither accelerated nor decelerated. This reduces or even avoids turbulences, further reducing drag and lifting forces.

Furthermore, the active rear spoiler and the additional active rear spoiler may for example be pivoted simultaneously.

In that example, the active rear spoiler and the additional active spoiler may be adapted to a current driving situation at the same time. This avoids periods, which may result in higher turbulences, wherein those periods the active rear spoiler and the additional active spoiler are not adapted to each other.

Further features, details and advantages of the invention result from the wording of the claims as well as from the following description of exemplary embodiments based on the drawings. The figures show:

DETAILED DESCRIPTION

Figure 1:
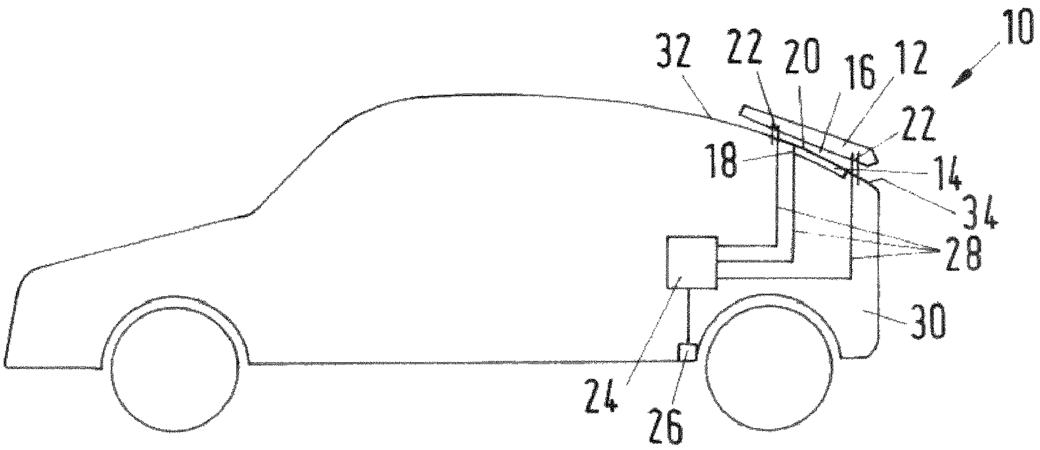
FIG. 1 a schematic drawing of a vehicle comprising the spoiler system.

FIG. 1 shows a vehicle 30 comprising a tail 34, a top surface 32 facing upwards and a spoiler system 10.

The spoiler system 10 comprises an active rear spoiler 12, an additional active spoiler 14 and a channel 16 being sandwiched between the active rear spoiler 12 and the additional active spoiler 14. The active rear spoiler 12 and the additional active spoiler 14 form the walls of the channel 16. The active rear spoiler 12 may for example be a floating spoiler. The tail 34 of the vehicle may also be called the stern or the back of the vehicle.

The active rear spoiler 12, the additional active spoiler 14, and the channel 16 are arranged at the tail 34 of the vehicle. The active rear spoiler 12 is spaced apart from the vehicle 30 by at least one support element 22. The channel 16 is arranged in the space between the active rear spoiler 12 and at least a portion of the top surface 32.

The top surface 32 refers the surface being on the upper side of the vehicle 30. At least a part of that top surface 32 faces the active rear spoiler 12. An angle between the active rear spoiler 12 and the top surface 32 of the vehicle 30 may be amended by pivoting the active rear spoiler 12 using the at least one support element 22. For that purpose, the active rear 12 may be connected to a motor for turning the active rear spoiler 12. Furthermore, the position of the active rear spoiler 12 may be changed. For example, the active rear spoiler 12 may be translated backwards or forwards and/or up and down in relation to the vehicle 30.

The additional active spoiler 14 is arranged at the top surface 32. A channel facing surface 20 of the additional active spoiler 14 adds to the top surface 32. This means that the channel facing surface 20 increases the top surface 32 of the vehicle 30. This does not necessarily mean that the channel facing surface 20 of the additional active spoiler 14 has the same orientation as the top surface 32. There may be an angle between the channel facing surface 20 and the top surface 32, the angle being between 0° and 180°, preferably between 0° and 90°, further preferably between 0° and 60°.

A leading edge 18 of the additional active spoiler 14 is attached to the top surface 32. The additional active spoiler 14 may be pivoted around the leading edge 18 to change the angle between the additional active spoiler 14 and the top surface 32. For that purpose, the additional active spoiler 14 may be connected to a further motor for turning the additional active spoiler 14 around the leading edge 18.

The spoiler system 10 further comprises a controller 24, which may be arranged at any position in the vehicle 30. The controller 24 is configured to control the active rear spoiler 12 and additional active spoiler 14. The control of the active rear spoiler 12 and the additional active spoiler 14 may be carried out simultaneously.

At least one signal line 28 may connect the controller 24 to the motor of the active rear spoiler 12 and the motor of the additional active spoiler 14. The signal line 28 may be wired or wireless.

The spoiler system 10 may further comprise at least one sensor 26, which may transmit signals to the controller 24. The sensor 26 may for example measure the velocity of the vehicle 30 or an aerodynamic pressure around the vehicle 30. The sensor 26 may further measure further properties.

The controller 24 may control the active rear spoiler 14 and the additional active spoiler 14 based on those measurements.

FIGS. 2*a* to 2*d* show different states or positions of the active rear spoiler 12 and the additional active spoiler 14 at the tail 34 of the vehicle 30.

Figure 2A:
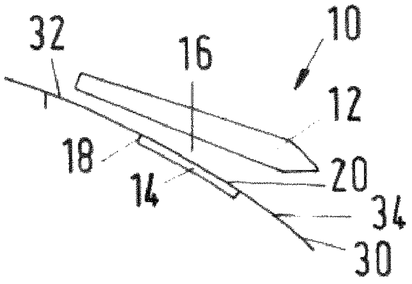
FIG. 2*a*-*d* a schematic drawing of a spoiler system in a vehicle in different positions.

FIG. 2*a* shows an undeployed position of the spoiler system 10. The additional active spoiler 14 is arranged flat on the tail 34 of the vehicle 30. The channel facing surface 20 of the additional active spoiler 14 is flush to the top surface 32 of the vehicle 30.

Figure 2B:
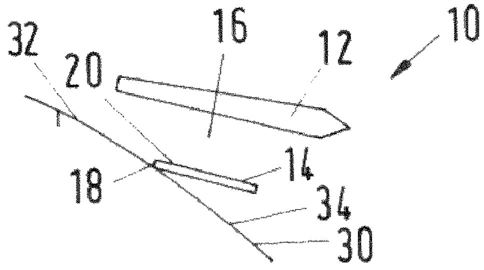
Figure 2C:
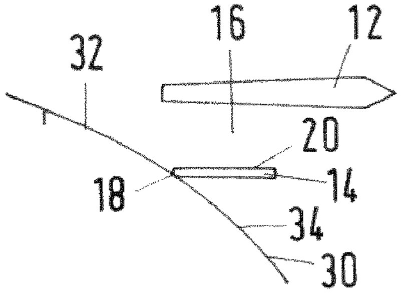
Figure 2D:
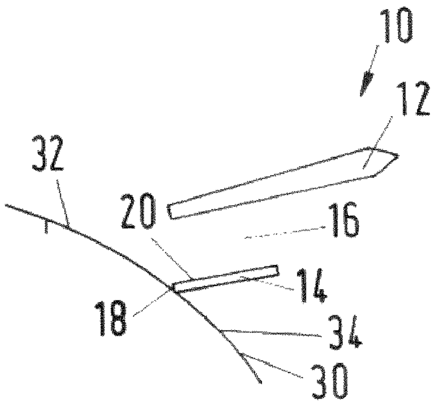

In relation to the further positions shown in FIGS. 2*b* to 2*d*, the active rear spoiler 12 is in the closest position to the tail 34. The width of the channel 16 is smallest in this position.

In the undeployed position of the spoiler system 10, the active rear spoiler 12 has minimal effect on the aerodynamics of the vehicle 30.

At least in FIGS. 2*b* to 2*d*, the active rear spoiler 12 and the additional active spoiler 14 are arranged parallel to each other and form parallel walls for the channel 16. In those figures, the active rear spoiler 12 is lifted up in relation to the undeployed position. In those positions, the active rear spoiler 12 and the top surface 32 vehicle 30 are angled to each other such, that the distance to the top surface 32 at the front of the active rear spoiler 12 is smaller than the distance to the top surface 32 at the back of the active rear spoiler 12.

Without the use of the additional active spoiler 14, the space between the active rear spoiler 12 and the top surface 32 would decrease the velocity of the air screaming at the bottom of the active rear spoiler 14. This would induce turbulences, which would increase drag and lifting forces.

By adjusting an angle of the additional active spoiler 14, the channel 16 between the additional active spoiler 14 and the active rear spoiler 12 can be shaped such, that turbulences are suppressed or avoided.

FIG. 2*b* shows a position of the spoiler system 10 for an economic driving mode. In this position, the active rear spoiler 12 is lifted from the top surface 32. The front of the active rear spoiler 12 is higher than the back of the active rear spoiler 12. In FIG. 2*b*, from left to right, the active rear spoiler 12 points downwards.

The additional active spoiler 14 has the same angle to a horizontal line than the active rear spoiler 12.

FIG. 2*c* shows a position of the spoiler system 10 for a sportive driving mode. In this position, the active rear spoiler 12 is substantially horizontal as well as the additional active spoiler 14.

In a braking mode shown in FIG. 2*d*, the active rear spoiler 12 is arranged such that it creates a high drag in combination with a downward force on the tail 34. The front of the active rear spoiler 12 is lower than the back of the active rear spoiler 12. The additional active spoiler 14 has a similar orientation.

Figure 3:
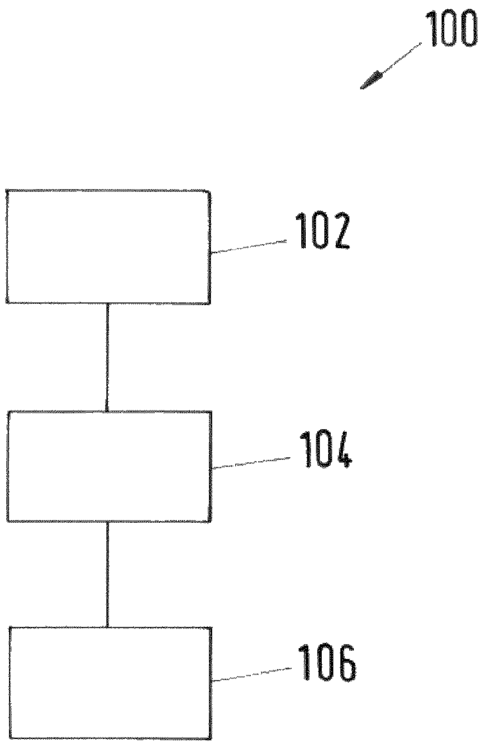
FIG. 3 a flowchart of the method for controlling the spoiler system and/or vehicle.

FIG. 3 shows a flowchart of the method 100 for controlling the spoiler system and/or the vehicle. The controller 24 may carry out the method 100.

In a step 102, a spoiler setting may be determined. The spoiler setting may be based on at least one driving property of the vehicle. A driving property may for example be a velocity, an acceleration and/or an aerodynamic pressure. A spoiler setting may be an angle or position of the active rear spoiler and/or additional active spoiler with respect to the top surface of the vehicle.

A sensor on the vehicle may determine the driving property. The sensor may transmit sensor signals encoding the driving property to the controller. The controller may then determine a spoiler setting for each spoiler from for example a table, a diagram or a calculation using formulas.

In a further step 104, the active rear spoiler is adapted according to the determined spoiler setting. The active rear spoiler may be pivoted and/or shifted with respect to the vehicle. For that purpose, the active rear spoiler may be connected to a motor that is configured to receive spoiler setting signals from the controller.

In step 106, the additional active spoiler is pivoted. The pivoting of the additional active spoiler is carried out in accordance to the pivoting angle of the active rear spoiler. Furthermore, the pivoting of the additional active spoiler may for example be carried out by taking into account the position of the active rear spoiler.

For example, the additional active spoiler maybe pivoted such that it is parallel to the active rear support.

Steps 104 and 106 may be carried out simultaneously. Furthermore, steps 102, 104, and 106 may be carried out in a loop such that orientation of the active rear spoiler and the additional active spoiler are continuously adapted to the current driving situation of the vehicle.

The invention is not limited to one of the aforementioned embodiments. It can be modified in many ways. All features and advantages resulting from the claims, the description and the drawing, including constructive details, spatial arrangements and procedural steps, may be essential for the invention both in themselves and in various combinations.

REFERENCE SIGNS

10 spoiler system
12 active rear spoiler
14 additional active spoiler
16 channel
18 leading edge
20 channel facing surface
22 support element
24 controller
26 sensor
28 signal line
30 vehicle
32 top surface
34 tail

What is claimed is:

1. A spoiler system for a vehicle, the system comprising: an active rear spoiler;

a controller configured to control the active rear spoiler; and a channel and an additional active spoiler for arranging on a tail of a vehicle, wherein the additional active spoiler is arranged below the active rear spoiler, wherein the channel is arranged between the active rear spoiler and the additional active spoiler, and wherein the controller is further configured to control the additional active spoiler;

wherein the controller is configured to control the active rear spoiler and the additional active spoiler such that the active rear spoiler and the additional active spoiler form parallel walls of the channel, wherein the active rear spoiler is connected to a first motor for turning the active rear spoiler, the additional active rear spoiler is connected to a second motor for turning the additional active rear spoiler, and at least one signal line connects the controller to the first motor and the second motor, wherein the additional active spoiler is a flap being arranged at the tail of the vehicle, and the flap is pivoted such that it is always parallel to the active rear spoiler.

2. The spoiler system according to claim 1, wherein the controller is configured to control the active rear spoiler and the additional active spoiler simultaneously.

3. The spoiler system according to claim 1, wherein the active rear spoiler is a floating spoiler.

4. The spoiler system according to claim 1, wherein the additional active spoiler comprises a leading edge, which is attached to a tail of a vehicle, wherein the additional active spoiler is pivotable around the leading edge.

5. A vehicle comprising a tail, a top surface facing upwards and the spoiler system according to claim 1, wherein the spoiler system is attached to the tail and the additional active spoiler comprises a channel facing surface, which adds to the top surface.

6. The vehicle according to claim 5, wherein the additional active spoiler comprises an undeployed position and at least one deployed position, wherein the additional active spoiler is arranged flat on the tail in the undeployed position and is splayed from the tail in the deployed position.

7. A method for controlling the spoiler system of the vehicle according to claim 5, the method comprising the following steps:

determining a spoiler setting based on at least one driving property of the vehicle;

adapting the active rear spoiler according to the determined spoiler setting; and pivoting the additional active spoiler according to the pivoting angle of the active rear spoiler.

8. The method according to claim 7, wherein in the step of pivoting the additional active spoiler according to the pivoting angle of the active rear spoiler, the additional active spoiler is pivoted to a position being parallel to the active rear spoiler.

9. The method according to claim 8, wherein the active rear spoiler and the additional active spoiler are pivoted simultaneously.

* * * * *